United States Patent
Musiboyina et al.

(10) Patent No.: US 11,797,891 B1
(45) Date of Patent: Oct. 24, 2023

(54) CONTEXTUAL BANDITS-BASED ECOSYSTEM RECOMMENDER SYSTEM FOR SYNCHRONIZED PERSONALIZATION

(71) Applicant: INTUIT INC., Mountain View, CA (US)

(72) Inventors: Yashwanth Musiboyina, Mountain View, CA (US); Dawn-Marie Chantel Miesner, San Francisco, CA (US); Mustapha Harb, Mountain View, CA (US); Nan Jiang, Mountain View, CA (US); Shahram Mohrehkesh, Mountain View, CA (US); Zachary Dorsch, Boise, ID (US); Suman Sundaresh, Mountain View, CA (US); Grace Wu, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/049,286

(22) Filed: Oct. 24, 2022

(51) Int. Cl.
*G06N 20/00* (2019.01)

(52) U.S. Cl.
CPC .................... *G06N 20/00* (2019.01)

(58) Field of Classification Search
CPC .................................................. G06N 20/00
See application file for complete search history.

(56) References Cited

U.S. PATENT DOCUMENTS

| | | | |
|---|---|---|---|
| 2021/0398193 A1* | 12/2021 | Cetintas | G06Q 30/0204 |
| 2022/0198598 A1* | 6/2022 | Li | G06N 7/01 |
| 2022/0351070 A1* | 11/2022 | Liu | G06N 3/006 |

OTHER PUBLICATIONS

Turgay, Eralp, Doruk Oner, and Cem Tekin. "Multi-objective contextual bandit problem with similarity information." In International Conference on Artificial Intelligence and Statistics, pp. 1673-1681. PMLR, 2018. (Year: 2018).*

* cited by examiner

*Primary Examiner* — Casey R. Garner
(74) *Attorney, Agent, or Firm* — DLA PIPER LLP (US)

(57) ABSTRACT

The instant systems and methods are directed to a contextual bandits machine learning model configured to enable granular synchronized ecosystem personalization and optimization. The system and methods determine an objective and feed the objective and one more lifecycle model propensity scores as inputs to the contextual bandits machine learning model. The contextual bandits machine learning model then generates one or more potential weighted model rewards, wherein each potential weighted model reward includes at least a desired user action, a weight, a channel, and an expected change to the objective, and selects a weighted model reward that optimizes the objective. An action recommendation is subsequently transmitted to a user device based on the weighted model reward, wherein the action recommendation is presented in a selected channel associated with the weighted model reward. Feedback associated with the action recommendation is collected and used in training and fine-tuning of the model.

19 Claims, 5 Drawing Sheets

CONTEXTUAL BANDITS-BASED ECOSYSTEM RECOMMENDER SYSTEM FOR SYNCHRONIZED PERSONALIZATION

BACKGROUND

Reinforcement learning is a mode of artificial intelligence focused on the training of machine learning models to make a sequence of decisions in order to achieve a goal in an uncertain environment. In general, a reinforcement learning agent is able to perceive and interpret its environment, take actions, and learn through trial and error. And the machine learning models learn through a machine learning training method based on rewarding desired actions and/or punishing undesired ones.

In enterprise resource management, a reinforcement machine learning algorithm can allocate limited resources to different tasks as long as there is an overall objective it is trying to achieve. An objective in this circumstance could be to save time, improve computational resources, prevent customer churn, increase revenue, or conserve resources, for example. However, improving enterprise resource management or achieving certain enterprise goals via reinforcement learning is not without its challenges. For example, reinforcement learning can be difficult to deploy, because it relies on significant computational resources and data in order to explore a particular environment. In another instance, it can be difficult to implement reinforcement machine learning in an enterprise environment when separate departments are implementing disparate campaigns with varying objectives.

Conventional approaches of reinforcement machine learning that address enterprise related issues have known inefficiencies. For example, conventional models that are leveraged by multiple departments within an enterprise typically fall prey to slow experimentation, which blocks productivity as new models cannot be added in the middle of an experiment. In addition, these conventional systems are challenging to configure to manage multiple inputs of varying formats. Therefore, certain calculations suffer, such as static optimization functions, because these calculations are based on limited data. Moreover, this limits that type of feedback that can be used to refine the reinforcement machine learning models. Accordingly, there is a need for a reinforcement machine learning model that addresses the deficiencies of the aforementioned conventional approaches.

DETAILED DESCRIPTION

Large enterprises that electronically provide services to customers across multiple online channels within an ecosystem often strive to ensure that every customer receives personalized recommendations that meet their needs throughout their business lifecycle. One conventional approach to providing personalized recommendations on an enterprise scale is through contextual bandits, which is a sub-category of reinforcement learning. However, as a form of reinforcement learning, conventional approaches to contextual bandits models suffer from many of the noted deficiencies in the field. For example, conventional contextual bandits approaches are notorious for being limited to optimizing only one objective at a time. As such, in an example where an enterprise may have several objectives (e.g., optimizing clickthrough rate, increasing product adoption, reducing turnover, and the like) to optimize, a conventional contextual bandits model will only be able to generate a recommendation that optimizes one of the objectives.

In contrast, the instant systems and methods overcome the deficiencies of conventional approaches by enabling the optimization of more than one objective, even objectives that are contradictory to each other, and further by providing flexibility and granularity, such that output recommendations generated by the instant contextual bandits machine learning model will be contextual to the channel where they are ultimately displayed.

The instant systems and methods achieve the improvements by implementing a contextual bandits machine learning model that leverages input from lifecycle models from each service within an ecosystem to generate a next best action recommendation for customers while simultaneously optimizing for multiple enterprise objectives. Unlike conventional contextual bandits models, the instant contextual bandits machine learning model additionally incorporates a rewards system configured to rank and determine an optimal next best action and best channel in which to display a recommendation for two or more contradictory objectives. The contextual bandits machine learning model additionally incorporates a feedback loop that improves the model as customers interact and engage across channels.

In some embodiments, these systems and methods improve upon conventional approaches by leveraging propensity scores from lifecycle models across multiple services within an enterprise ecosystem, using domain specific user actions to generate rewards, and by using action-dependent-feature algorithms to train the model.

Embodiments of the present disclosure relate to systems and methods for a contextual bandits machine learning model that generates output including a next action recommendation that is presented to a user at an optimal channel determined by the contextual bandits machine learning model. The implementation of these concepts may include, in one respect, implementation of one or more artificial intelligence techniques and one or more machine learning models that, in response to determining an enterprise objective, receives one or more life cycle model outputs (e.g., propensity scores) and user action as input, generates one or more model rewards, selects the optimal model reward, and transmits an optimal action recommendation at an optimal channel to a user.

Figure 1:
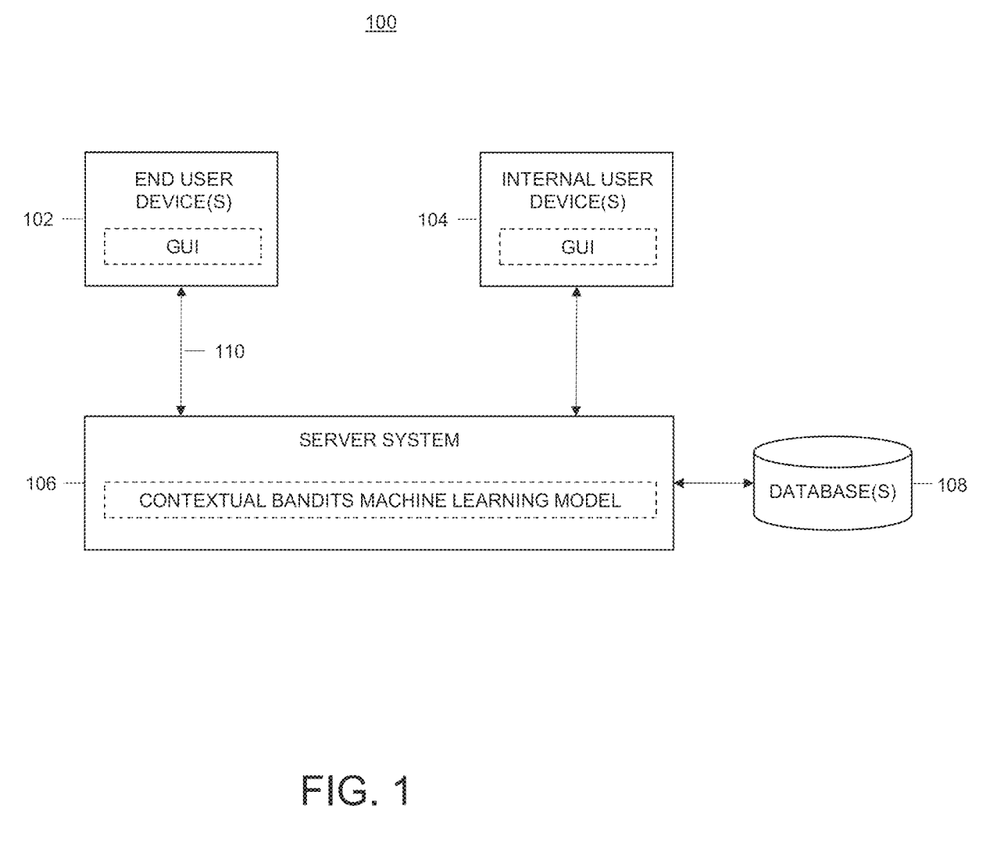
FIG. 1 illustrates a computing environment, according to various embodiments of the present disclosure.

Referring to FIG. 1, computing environment 100 can be configured to automatically and intelligently implement a contextual bandits machine learning model, according to embodiments of the present disclosure. Computing environment 100 may include one or more user device(s) 102, a server system 106, one or more databases 108, and/or one or more internal user device(s) 104, communicatively coupled to the server system 106. The user device(s) 102, one or more internal user device(s) 104, server system 106, and database(s) 108 may be configured to communicate through network 110.

In one or more embodiments, user device(s) 102 is operated by a user. User device(s) 102 may be representative of a mobile device, a tablet, a desktop computer, or any computing system having the capabilities described herein. Users may include, but are not limited to, individuals such as, individuals, companies, prospective clients, and or customers of an entity associated with server system 106, such as individuals who have received a notice document and are utilizing the services of, or consultation from, an entity associated with that document and server system 106.

User device(s) 102 according to the present disclosure may include, without limit, any combination of mobile phones, smart phones, tablet computers, laptop computers, desktop computers, server computers or any other computing device configured to capture, receive, store and/or disseminate any suitable data. In one embodiment, a user device(s) 102 includes a non-transitory memory, one or more processors including machine readable instructions, a communications interface which may be used to communicate with the server system (and, in some examples, with the database(s) 108), a user input interface for inputting data and/or information to the user device and/or a user display interface for presenting data and/or information on the user device. In some embodiments, the user input interface and the user display interface are configured as an interactive graphical user interface (GUI). The user device(s) 102 are also configured to provide the server system 106, via the interactive GUI, input information such a user actions (e.g., clickstream data, in session behavior, user features, user preferences, user settings, user profile information, and the like) for further processing. In some embodiments, the interactive GUI is hosted by the server system 106 or provided via a client application operating on the user device. In some embodiments, a user operating the user device(s) 102 may query server system 106 for information related to a service provided by an entity hosting server system 106.

In one or more embodiments, each agent device(s) 104 is operated by a user under the supervision of the entity hosting and/or managing server system 106. Agent device(s) 104 may be representative of a mobile device, a tablet, a desktop computer, or any computing system having the capabilities described herein. Users of the agent device(s) 104 include, but are not limited to, individuals such as, for example, software engineers, database administrators, employees, and/or customer service agents, of an entity associated with server system 106.

Agent device(s) 104 according to the present disclosure include, without limit, any combination of mobile phones, smart phones, tablet computers, laptop computers, desktop computers, server computers or any other computing device configured to capture, receive, store and/or disseminate any suitable data. In one embodiment, each agent device(s) 104 includes a non-transitory memory, one or more processors including machine readable instructions, a communications interface that may be used to communicate with the server system (and, in some examples, with the database 108), a user input interface for inputting data and/or information to the user device and/or a user display interface for presenting data and/or information on the user device. In some examples, the user input interface and the user display interface are configured as an interactive GUI. The agent device(s) 104 are also configured to provide the server system 106, via the interactive GUI, input information (e.g., queries) for further processing. In some examples, the interactive GUI may be hosted by the server system 106 or it may be provided via a client application operating on the user device.

The server system 106 includes one or more processors, servers, databases, communication/traffic routers, non-transitory memory, modules, and interface components. In one or more embodiments, server system 106 hosts, stores, and operates a contextual bandits machine learning model. Server system 106 may be configured to train a contextual bandits machine learning model. Server system 106 may further be configured to receive or determine an objective associated with an entity or organization. Server system 106 may be further configured to receive outputs from one or more lifecycle models, one or more electronic user actions, and the objective, as inputs at the contextual bandits machine learning model. In response to receiving the outputs from the life cycle models, electronic user actions, and the objectives, the contextual bandits machine learning model may generate one or more potential weighted model rewards, wherein each potential weighted model reward includes at least a desired user action, a weight, a channel, and an expected change to the objective. The contextual bandits machine learning model may then select a weighted model reward, out of the potential weighed model rewards, that optimizes the objective. In response to selecting a weighted reward, the contextual bandits machine learning model may transmit an action recommendation to a user device based on the weighted model reward, wherein the action recommendation is presented in a selected channel associated with the weighted model reward.

Moreover, the server system 106 may include security components capable of monitoring user rights and privileges associated with initiating API requests for accessing the server system 106 and modifying data in the database 108. Accordingly, the server system 106 may be configured to manage user rights, manage access permissions, object permissions, and the like. The server system 106 may be further configured to implement two-factor authentication, secure sockets layer (SSL) protocols for encrypted communication sessions, biometric authentication, and token-based authentication.

Database 108 may be locally managed, and/or may be a cloud-based collection of organized data stored across one or more storage devices. The database 108 may be complex and developed using one or more design schema and modeling techniques. The database 108 may be hosted at one or more data centers operated by a cloud computing service provider. The database 108 may be geographically proximal to or remote from the server system 106 and is configured for data dictionary management, data storage management, multi-user access control, data integrity, backup and recovery management, database access language application programming interface (API) management, and the like. The database 108 is in communication with server system 106, end user device(s) 102, and agent device(s) 104, via network 110. The database 108 stores various data, including training data (e.g., user clickstream data and user responses to next action recommendations) that can be modified and leveraged by server system 106 and agent device(s) 104. Various data in the database 108 will be refined over time using a contextual bandits machine learning model, for example the large language model discussed with respect to FIGS. 2-3. Additionally, the database 108 may be deployed and maintained automatically by one or more components shown in FIG. 1.

Network 110 may be of any suitable type, including individual connections via the Internet, cellular or Wi-Fi networks. In some embodiments, network 110 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, LAN, or the Internet. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

In some embodiments, communication between the elements may be facilitated by one or more application programming interfaces (APIs). APIs of server system 106 may be proprietary and/or may be examples available to those of ordinary skill in the art such as Amazon® Web Services (AWS) APIs or the like.

Figure 2:
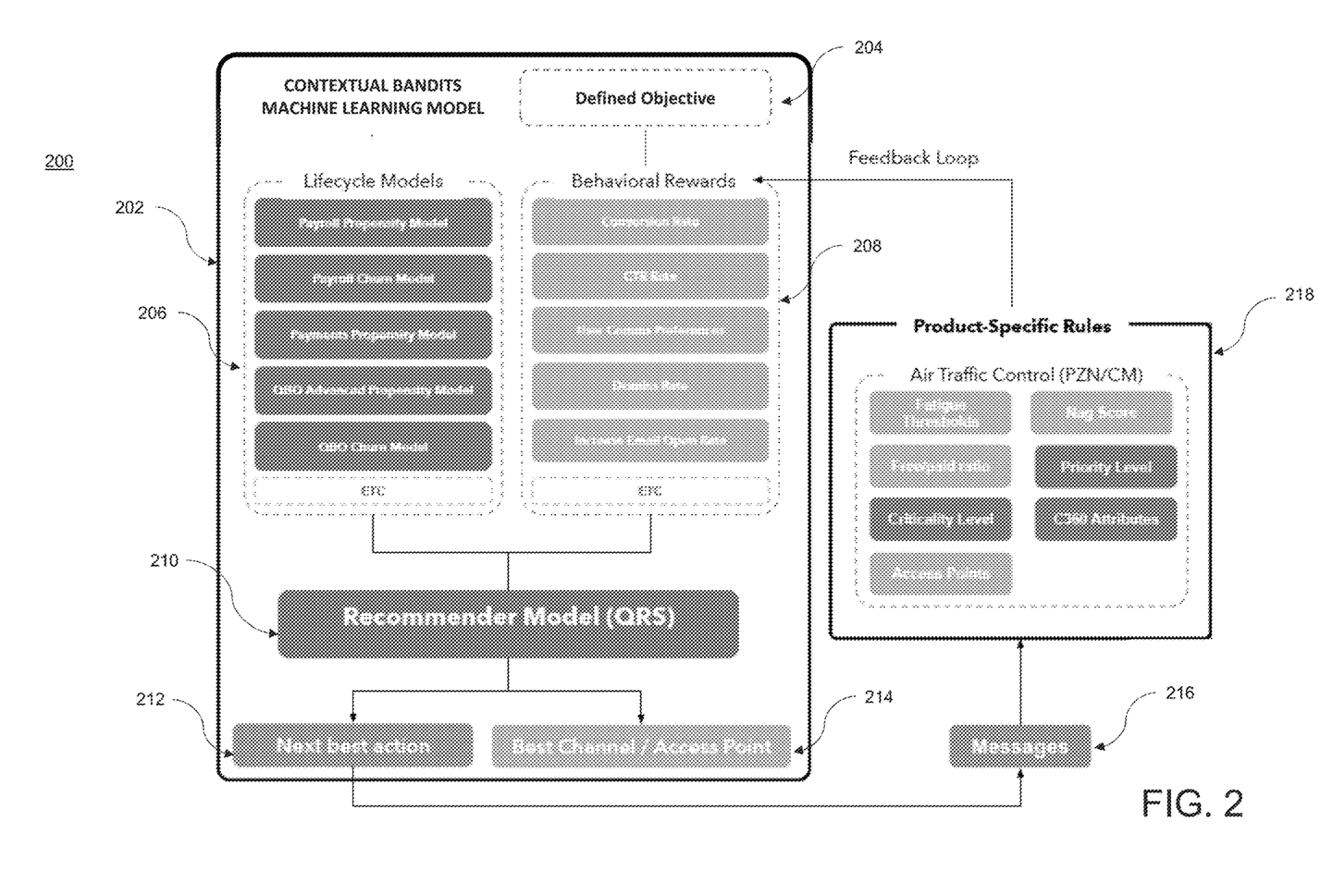
FIG. 2 illustrates a contextual bandits machine learning framework, according to various embodiments of the present disclosure.

Referring to FIG. 2, an example contextual bandits machine learning framework process 200 is depicted, according to various embodiments of the present disclosure. As depicted, a contextual bandits machine learning framework process 200 may include a contextual bandits machine learning model 202, message 216, and product-specific rules 218.

The contextual bandits machine learning model 202 may further include a defined objective 204, output from lifecycle models 206, behavioral rewards 208, cross channel online model 210, a next best action 212, best channel/access point 214. In one embodiment, the defined objective 204 is a target or goal established by an entity operating the contextual bandits machine learning framework process 200 and/or server system 106. In another embodiment, the defined objective 204 is a target or goal automatically established by the contextual bandits machine learning model 202 based on training data. In a non-limiting capacity, the defined objective 204, is for example, one or more of a software experiment goal, an expected product adoption goal, a churn prevention goal, a revenue goal, expected revenue for a given period of time, and the like. The defined objective 204 is a numerical value that can be used as input for downstream processes, such as input for the cross channel online model 210. The defined objective 204 can be a multi-objective function defined to optimize one or more (possibly contradictory) business objective(s) and user objective(s) simultaneously.

A machine learning system (e.g., Vowpal Wabbit) that leverages techniques such as online, hashing, allreduce, reductions, learning2search, active, and interactive learning, to train the contextual bandits machine learning model 202. In addition, to accommodate changing sets of eligible recommendations and avoid interruptions to continuous integration and deployment of new local models and marketing offers, action-dependent-feature algorithms to train the model.

In a non-limiting capacity, the contextual bandits machine learning model 202 generates output for product or retention action recommendations at the desired level of granularity. For synchronized marketing campaigns, product level recommendation may be used so users (e.g., customers) can receive a consistent product experience across various channels. Channel level (next best channel) or access point level (best access point) can be chosen to accommodate more granular recommendations. Action recommendations are produced from the individual propensity models.

The lifecycle models 206, supervised machine learning, in instance, are propensity models predicting the probability of a customer to attach, churn, or upgrade to a product or service. The output of the lifecycle models 206 are propensity scores and an action recommendation (i.e., a product feature that could potentially increase a customer's likelihood to perform an action (e.g., convert/retain)). In addition, the lifecycle model 206 may produce predictions on an hourly, daily, or monthly basis, or in real-time if requested. The output of the lifecycle models 206 are passed to the cross channel online model 210 as input.

The behavioral rewards 208, in a non-limiting capacity, include but are not limited to user actions, for example actions indicative of how a user interacted with a service or product. As depicted, some forms of user actions include purchase, attach, clicks, user communication preferences, dismisses, and email opens. The behavioral rewards 208 are passed to the cross channel online model 210 as input.

Notably, both the output from the lifecycle models 206 and behavioral rewards 208, in some instances, may be unstructured non-numeric data that is converted into numeric format as appropriate before being passed to the cross channel online model 210 as input.

The cross channel online model 210 may be configured to construct a model reward based on the output from the defined objective 204, the lifecycle models 206, and the behavioral rewards 208. In this instance, the context for the cross channel online model 210 may be propensity scores from the lifecycle models 206, lifecycle models 206 dependent features, and the like. The cross channel online model 210 may additionally take in historical user actions (e.g., user click stream data, user in-session behavior, conversion, and churn, information as feedback). In one embodiment, constructing a reward includes generating several potential outcomes given the defined objective 204 and selecting the potential outcome that would result in the most optimal outcome if enacted upon by a customer.

In one example, a defined objective 204 could be increasing the adoption of software version upgrades by users of a particular software product.

TABLE 1

EXAMPLE REWARD CONSTRUCTION FOR INCREASING SOFTWARE UPGRADE FORMULA: WEIGHT × EXPECTED DELTA IN DEFINED OBJECTIVE

| USER ACTION | WEIGHT 1 | EXPECTED DELTA | EXPECTED MODEL REWARD |
|---|---|---|---|
| IF CLICK ON SOFTWARE (A) IMPRESSION | 1 | 100 | 100 |
| IF DISMISSED SOFTWARE (A) IMPRESSION | 0.005 | −10 | −.05 |
| IF IMPRESSION SOFTWARE (A) WITH NO REACTION TO IMPRESSION | 0.002 | −1 | −.002 |
| IF CLICK ON SOFTWARE (B) IMPRESSION | 1 | 50 | 50 |
| IF DISMISSED SOFTWARE (B) IMPRESSION | 0.005 | −4 | −.02 |

TABLE 1-continued

EXAMPLE REWARD CONSTRUCTION
FOR INCREASING SOFTWARE UPGRADE
FORMULA: WEIGHT × EXPECTED
DELTA IN DEFINED OBJECTIVE

| USER ACTION | WEIGHT 1 | EXPECTED DELTA | EXPECTED MODEL REWARD |
|---|---|---|---|
| IF IMPRESSION SOFTWARE (B) WITH NO REACTION TO IMPRESSION | 0.002 | −2 | −.004 |

As depicted in Table 1, the three possible potential outcomes, for both software A and software B are if the user clicks on upgrading the software, if the user dismisses upgrading the software, and if an impression is made to the user with no further user action. The cross channel online model 210 is configured to rank the predicted model rewards and select the predicted model reward that will optimize the defined objective 204. Assuming the highest predicted model reward reflects the most optimal potential outcome, the cross channel online model 210 will select between software A or B, depending on all users' historical feedback to recommendations of upgrading software A or B. For example, if the contextual bandits machine learning model predicts that the user will have very low probability of clicking on upgrading software A recommendation, hence reducing the overall expected reward across all possible click/dismissal/impression reactions, even though its expected model reward for click is 100, the cross channel online model 210 may choose to recommend upgrading software B because user is more likely to click on the recommendation and gain a reward of 50. Table 1 and this example further reflects the fact that the defined objective 204 can be a multi-objective function that is embedded in a reward function, wherein the defined objective 204 can be defined such that it can be optimized for several competing/contradictory objectives for both an entity associated with server system 106 and a user operating user device(s) 102.

The contextual bandits machine learning framework process 200 is configured to dynamically update its policies based on implementing various exploit-explore techniques, as depicted in the reward construction scenarios outlined in Table 1 and Table 2. For example, the contextual bandits machine learning framework process 200 is configured to select the reward that has the highest propensity that will provide the optimal outcome, such that it will automatically explore and seek the optimal outcome for any combination of potential outcomes wherein the propensity score for the combination of potential outcome is less than 1 (i.e., wherein a score of 1 is 100% optimized). Alternatively, the contextual bandits machine learning framework process 200 will recognize an optimal potential outcome that has a propensity score of 1 (i.e., 100% optimized) and deterministically exploit that as long as the propensity score for that potential outcome remains at 1. Said automated explore-exploit techniques provide an improvement over conventional systems, that require manual processes for identifying less than optimal potential outcomes, which in turn prevent conventional models from taking real-time intervention measures with users.

The cross channel online model 210 is further configured to generate output including a next best action 212 (e.g., a product and/or a retention action recommendation) at the desired level of granularity. The cross channel online model 210 is further configured to determine a best channel/access point 214 (e.g., a next best channel and/or a best access point) that can be chosen to accommodate more granular recommendation strategy. The next best action 212 could include but is not limited to a user clicking on an impression, a user adding on an additional service/product, a user retention (i.e., churn prevention), service/product upgrade/downgrade, no user action, and the like. The best channel/access point 214 could include but is not limited to a pop-up, landing page, region within an application or website, email, text message, in-app communication, notification, and the like, in which the message 216 is presented to a user operating user device(s) 102.

The contextual bandits machine learning model 202 is configured to generate and transmit a message 216 (e.g., an action recommendation) including the determined next best action 212 and best channel/access point 214 to a user device(s) 102. However, the message 216 is further transmitted to the user device(s) 102 according to product-specific rules 218. The product-specific rules incorporate/introduce context in two instances. The first instance is when the lifecycle models do not use the context as input and the second instance is when the lifecycle models are not available.

Subsequent to the message being transmitted to the user device(s) 102 the contextual bandits machine learning framework process 200 is configured to receive a user's action (or no action) responsive to receiving the message 216 as feedback. The feedback can include clickstream data that can be used to update and refine the contextual bandits machine learning model 202.

Figure 3:
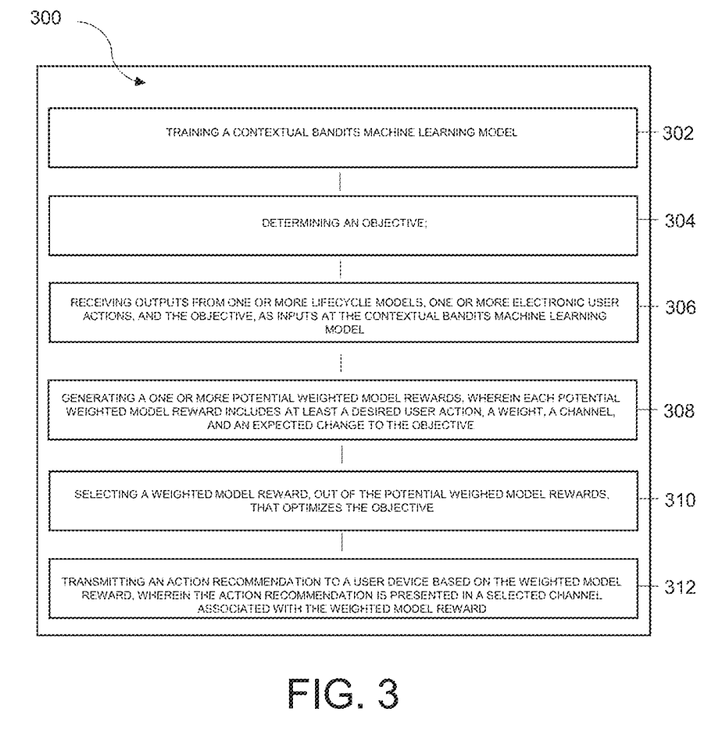
FIG. 3 illustrates a method for generating a next action recommendation through a contextual bandits machine learning model, according to various embodiments of the present disclosure.

Referring to FIG. 3, illustrates a method for generating a next action recommendation 300 through a contextual bandits machine learning model 202 (e.g., contextual bandits machine learning model 202), according to various embodiments of the present disclosure. At 302, server system 106, is configured to train a contextual bandits machine learning model. As discussed in relation to the contextual bandits machine learning framework process 200, training includes receiving feedback from prior instances (e.g., historical data) in which a message 216 was sent to user device(s). Here server system 106 will refine the contextual bandits machine learning model 202 to optimally generate a next best action 212 and a best channel/access point 214. The server system 106 is further configured to validate contextual bandits machine learning model 202 output (e.g., a message 216/user action recommendation, etc.) through counterfactual evaluation using Doubly-robust estimator to evaluate the newly trained contextual bandits machine learning model 202 and its associated policies and/or by evaluating the change in a specific objective over time.

At 304 server system 106 determines an objective. The objective can be automatically determined based on training data, past/current/future campaigns, and the like. The objective can be determined by a user operating agent device(s) 104. The defined objective 204 is a numerical value that can be used as input for downstream processes, such as input for the cross channel online model 210.

At 306, server system 106 is configured to receive outputs from one or more lifecycle models, one or more electronic user actions, and the objective, as inputs at the contextual bandits machine learning model 202. For example, the contextual bandits machine learning model 202 may receive input from the output of one or more supervised machine learning propensity models predicting the probability of a customer to attach, churn, or upgrade to a product or service.

In some instances where the output from the learning propensity models is non-numeric, the server system 106 is configured to convert and/or reformat the output such that it is numeric prior to being fed into the contextual bandits machine learning model 202.

At 308, server system 106 is configured to generate one or more potential weighted model rewards, wherein each potential weighted model reward includes at least a desired user action (i.e., next best action 212), a weight, a channel (i.e., best channel/access point 214), and an expected change to the objective (i.e., defined objective 204). The server system 106 is configured to determine which of the one more potential model rewards has the highest predicted model reward by applying weights and/or propensity score from the lifecycle models to the objective.

At 310, server system 106 is configured to select a weighted model reward, out of the potential weighed model rewards, that optimizes the objective. Here, depending on the objective, the server system 106, via the contextual bandits machine learning model 202, is configured to identify the next best action 212 and best channel/access point 214 based on the potential model reward out of the one or more potential model rewards that optimizes the objective.

At 312, server system 106 is configured to transmit an action recommendation to a user device based on the weighted model reward, wherein the action recommendation is presented in a selected channel associated with the weighted model reward. Here, server system 106 generates a message 216 that is transmitted to a user device(s) 102. The message 216 will prompt a user operating user device(s) 102 to perform (or not perform) a certain action. Further, the message 216 will be presented to the user at the best channel/access point 214 on a platform, website, application, and/or within an ecosystem hosted by an entity associated with server system 106.

Notably, the action taken by the user in response to receiving the message 216 can be collected and used as feedback to further refine the contextual bandits machine learning model 202.

Figure 4:
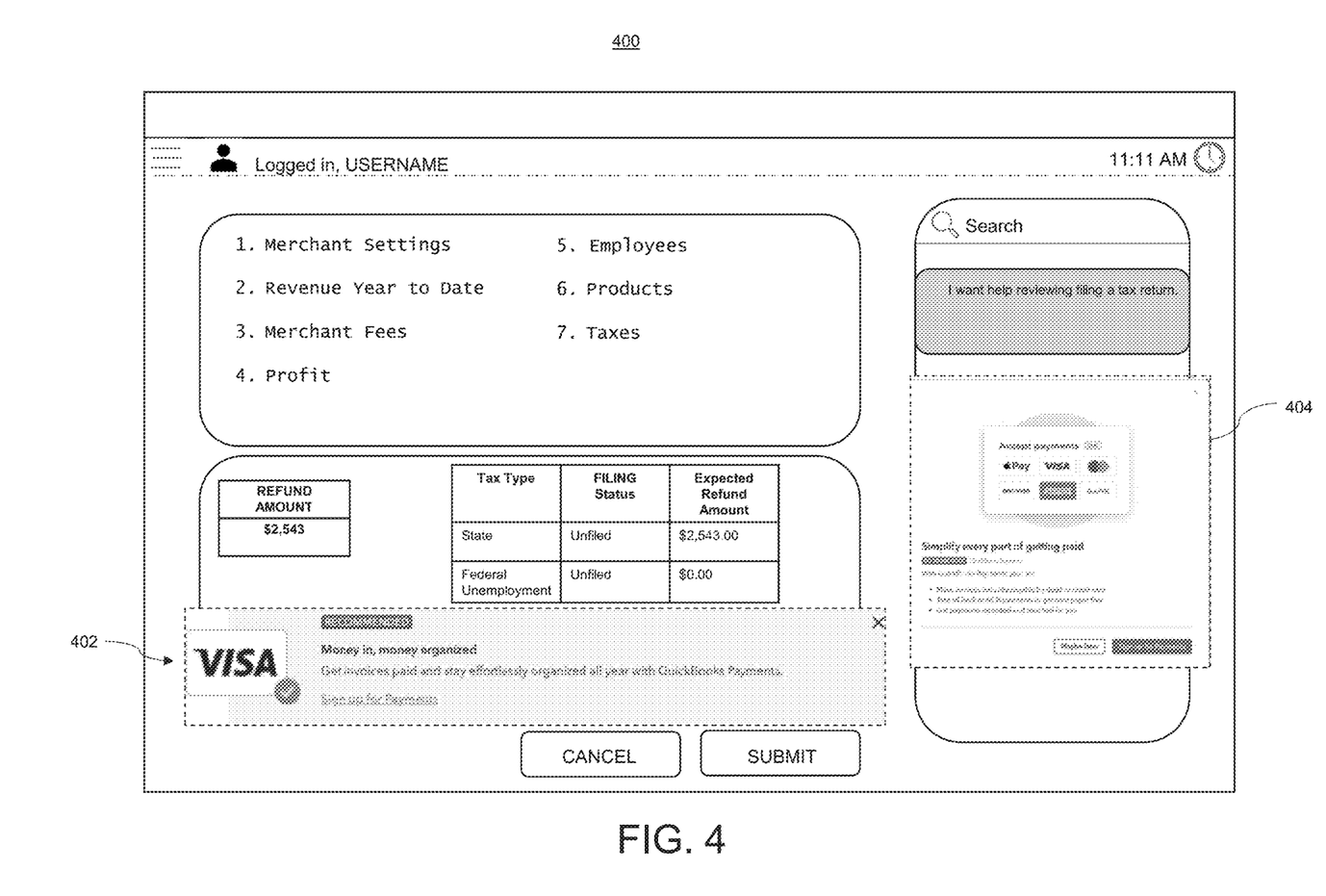
FIG. 4 illustrates an interactive graphical user interface for receiving out from a contextual bandits machine learning framework, according to various embodiments of the present disclosure.

FIG. 4 shows an interactive graphical user interface (GUI) 400 for receiving out from a contextual bandits machine learning framework, according to various embodiments of the present disclosure. In some instances, the interactive GUI 400 may be a stand-alone application, or a sub-feature associated within a software product or website. The interactive GUI 400 can be operated by one or more users using one or more user device(s) 102. In some embodiments, interactive GUI 400 initiates and plays an integral role for processes associated with providing a message 216 generated by a contextual bandits machine learning model 202. Interactive GUI 400 can additionally play an integral role in training the contextual bandits machine learning model 202 by capturing user actions and/or a lack of user action in response to receiving a message 216. As depicted in FIG. 4, interactive GUI 400 includes several dynamic regions for populating features that enable a user operating user device(s) 102 to interact with services hosted by an entity operating server system 106. In the illustrated example, interactive GUI 400 one or more versions of a message 216 may be dynamically populated via an optimal best channel/access point 214. For example, a first recommendation 402 may be populated in a region that has been determined by server system 106 (via contextual bandits machine learning model 202) to most optimally reach a specific user along with a prompt (e.g., a recommendation) also determined to optimally achieve a defined objective 204. Interactive GUI 400 also depicts a second recommendation 404. The second recommendation is presented in a different region and presents a different prompt. However, this is merely to illustrate that server system 106 is capable of determining the optimal next best action 212 and a best channel/access point 214 to present a message 216 tailored to each user interacting with an ecosystem hosted by server system 106. Recommendations (e.g., first recommendation 402 and second recommendation 404) can be sent to users operating devices (e.g., user device(s) 102 and internal user device(s) 104) interacting with server system 106.

Figure 5:
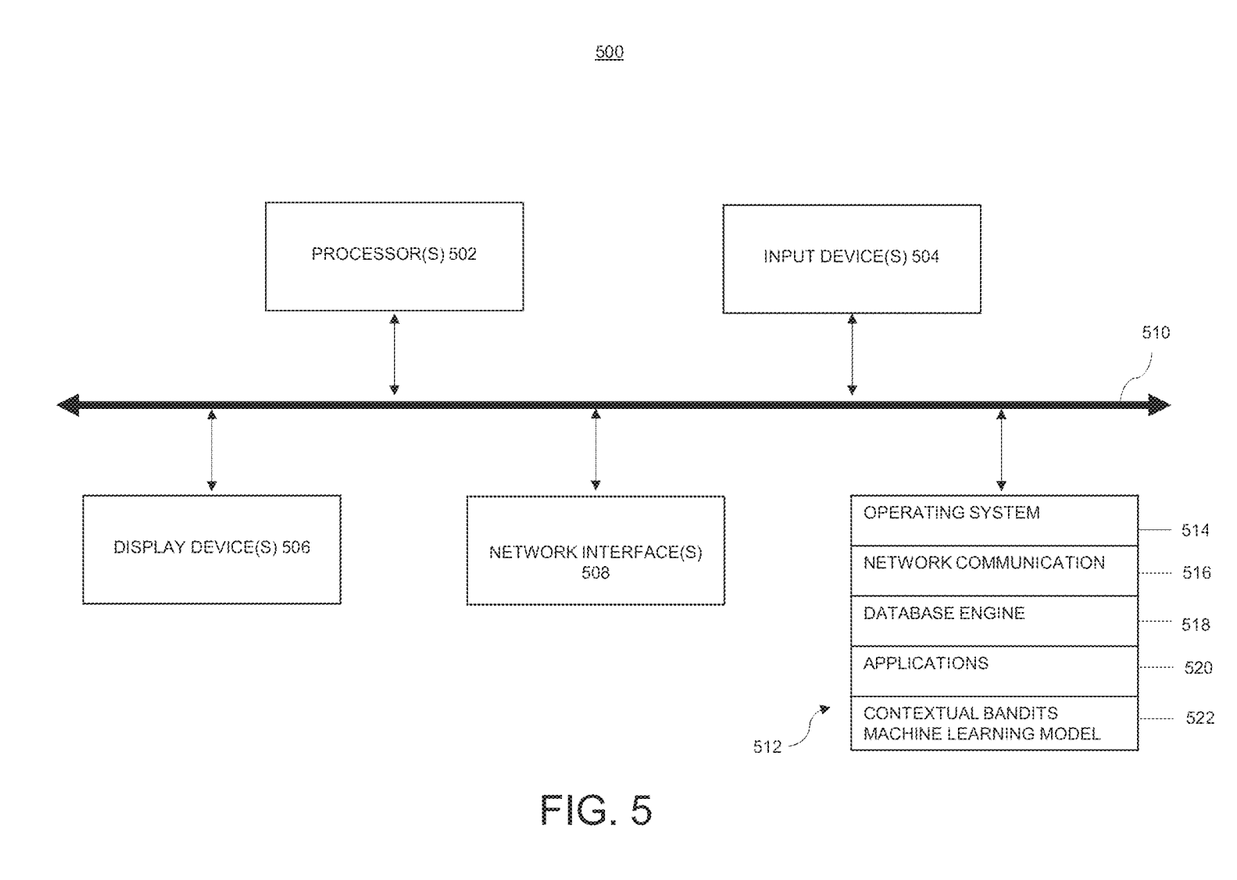
FIG. 5 illustrates a block diagram for a computing device, according to various embodiments of the present disclosure.

Referring to FIG. 5, a block diagram for a computing device is depicted, according to various embodiments of the present disclosure. For example, computing device 500 may function as server system 106. The computing device 500 may be implemented on any electronic device that runs software applications derived from compiled instructions, including without limitation personal computers, servers, smart phones, media players, electronic tablets, game consoles, email devices, etc. In some implementations, the computing device 500 may include processor(s) 502, (one or more) input device(s) 504, one or more display device(s) 506, one or more network interfaces 508, and one or more computer-readable medium(s) 512 storing software instructions. Each of these components may be coupled by bus 510, and in some embodiments, these components may be distributed among multiple physical locations and coupled by a network 110.

Display device(s) 506 may be any known display technology, including but not limited to display devices using Liquid Crystal Display (LCD) or Light Emitting Diode (LED) technology. Processor(s) 502 may use any known processor technology, including but not limited to graphics processors and multi-core processors. Input device(s) 504 may be any known input device technology, including but not limited to a keyboard (including a virtual keyboard), mouse, track ball, camera, and touch-sensitive pad or display. Bus 510 may be any known internal or external bus technology, including but not limited to ISA, EISA, PCI, PCI Express, USB, Serial ATA or FireWire. Computer-readable medium(s) 512 may be any non-transitory medium that participates in providing instructions to processor(s) 502 for execution, including without limitation, non-volatile storage media (e.g., optical disks, magnetic disks, flash drives, etc.), or volatile media (e.g., SDRAM, ROM, etc.).

Computer-readable medium(s) 512 may include various instructions for implementing an operating system 514 (e.g., Mac OS®, Windows®, Linux). The operating system may be multi-user, multiprocessing, multitasking, multithreading, real-time, and the like. The operating system may perform basic tasks, including but not limited to: recognizing input from input device(s) 504; sending output to display device(s) 506; keeping track of files and directories on computer-readable medium(s) 512; controlling peripheral devices (e.g., disk drives, printers, etc.) which can be controlled directly or through an I/O controller; and managing traffic on bus 510. Network communications instructions 516 may establish and maintain network connections (e.g., software for implementing communication protocols, such as TCP/IP, HTTP, Ethernet, telephony, etc.).

Database processing engine 518 may include instructions that enable computing device 500 to implement one or more methods as described herein. Application(s) 520 may be an application that uses or implements the processes described herein and/or other processes. The processes may also be implemented in operating system 514. For example, application(s) 520 and/or operating system 514 may execute one or more operations to intelligently process documents (i.e., tax notices) via one or more natural language processing and/or machine learning algorithms.

Contextual bandits machine learning model 522 may be used in conjunction with one or more methods as described above. Historical user data (e.g., user actions, user profile information, user subscription information, and the like) and lifecycle propensity data may be fed into contextual bandits machine learning model 522 to generate messages including optimal recommendations presented at optimal channels and access points in real-time.

The described features may be implemented in one or more computer programs that may be executable on a programmable system including at least one programmable processor coupled to receive data and instructions from, and to transmit data and instructions to a data storage system (e.g., database 108), at least one input device, and at least one output device. A computer program is a set of instructions that can be used, directly or indirectly, in a computer to perform a certain activity or bring about a certain result. A computer program may be written in any form of programming language (e.g., Janusgraph, Gremlin, Sandbox, SQL, Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

It is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A system comprising:
a server comprising one or more processors; and
a non-transitory memory, in communication with the server, storing instructions that when executed by the one or more processors, causes the one or more processors to implement a method comprising:
determining an objective;
receiving outputs from one or more lifecycle models, one or more electronic user actions, and the objective, as inputs at a contextual bandits machine learning model;
generating, by the contextual bandits machine learning model, one or more potential weighted model rewards, wherein each potential weighted model reward includes at least a desired user action, a weight, a channel, and an expected change to the objective;
selecting by the contextual bandits machine learning model a weighted model reward out of the one or more potential weighted model rewards, that optimizes the objective;
transmitting an action recommendation to a user device based on the weighted model reward, wherein the action recommendation is presented in a selected channel associated with the weighted model reward; and
refining the contextual bandits machine learning model responsive to a user action associated with the action recommendation.

2. The system of claim 1, the contextual bandits machine learning model is configured to rank the one or more potential weighted model rewards and select the weighted model reward with a highest predicted model reward.

3. The system of claim 1, wherein training the contextual bandits machine learning model further includes receiving feedback clickstream data from the user device.

4. The system of claim 1, wherein the action recommendation optimizes the objective.

5. The system of claim 1, wherein the server is configured to validate the action recommendation generated by the contextual bandits machine learning model via counterfactual evaluation.

6. The system of claim 1, wherein the action recommendation includes at least one of a user clicking on an impression, a user adding on an additional service/product, user churn prevention, service/product upgrade/downgrade, or no user action.

7. The system of claim 1, further comprising converting any non-numeric output from the one or more lifecycle models to numeric value.

8. The system of claim 1, wherein the objective includes two or more contradicting objectives.

9. A system comprising:
a server comprising one or more processors; and
a non-transitory memory, in communication with the server, storing instructions that when executed by the one or more processors, causes the one or more processors to implement a method comprising:
determining an objective;
receiving outputs from one or more lifecycle models, one or more electronic user actions, and the objective, as inputs at a contextual bandits machine learning model;
generating by the contextual bandits machine learning model one or more potential weighted model rewards, wherein each potential weighted model reward includes at least a desired user action, a weight, a channel, and an expected change to the objective;
selecting by the contextual bandits machine learning model a weighted model reward out of the one or more potential weighted model rewards, that optimizes the objective;
transmitting an action recommendation to a user device based on the weighted model reward; and
refining the contextual bandits machine learning model responsive to a user action associated with the action recommendation.

10. The system of claim 9, the contextual bandits machine learning model is configured to rank the one or more potential weighted model rewards and select the weighted model reward with a highest predicted model reward.

11. The system of claim 9, wherein training the contextual bandits machine learning model further includes receiving feedback clickstream data from the user device.

12. The system of claim 9, wherein the action recommendation optimizes the objective.

13. The system of claim 9, wherein the server is configured to validate the action recommendation generated by the contextual bandits machine learning model via counterfactual evaluation.

14. The system of claim 9, wherein the action recommendation includes at least one of a user clicking on an impression, a user adding on an additional service/product, user churn prevention, service/product upgrade/downgrade, or no user action.

15. The system of claim 9, further comprising converting any non-numeric output from the one or more lifecycle models to numeric value.

16. The system of claim 9, wherein the objective includes two or more contradicting objectives.

17. A computer-implemented method comprising:
determining, by at least one processor, an objective;
receiving, by the at least one processor, outputs from one or more lifecycle models, one or more electronic user actions, and the objective, as inputs at a contextual bandits machine learning model;
generating, by the at least one processor, by the contextual bandits machine learning model one or more potential weighted model rewards, wherein each potential weighted model reward includes at least a desired user action, a weight, a channel, and an expected change to the objective;
selecting, by the at least one processor, by the contextual bandits machine learning model a weighted model reward out of the one or more potential weighted model rewards, that optimizes the objective;
transmitting, by the at least one processor, an action recommendation to a user device based on the weighted model reward; and
refining, by the at least one processor, the contextual bandits machine learning model responsive to a user action associated with the action recommendation.

18. The computer-implemented method of claim 17, the contextual bandits machine learning model is configured to rank the one or more potential weighted model rewards and select the weighted model reward with a highest predicted model reward; and
wherein training the contextual bandits machine learning model further includes receiving feedback clickstream data from the user device.

19. The computer-implemented method of claim 17, wherein the action recommendation optimizes the objective;
wherein the objective further includes two or more contradicting objectives; and wherein the at least one processor is configured to validate the action recommendation generated by the contextual bandits machine learning model via counterfactual evaluation; and wherein the action recommendation includes at least one of a user clicking on an impression, a user adding on an additional service/product, user churn prevention, service/product upgrade/downgrade, or no user action.

* * * * *